United States Patent
Carlson

(10) Patent No.: US 11,148,506 B2
(45) Date of Patent: Oct. 19, 2021

(54) IMPACT-ABSORBING PRESSURE RELIEF ASSEMBLY HAVING COVER

(71) Applicant: Illinois Tool Works Inc., Glenview, IL (US)

(72) Inventor: Daniel David Carlson, Fenton, MI (US)

(73) Assignee: Illinois Tool Works Inc., Glenview, IL (US)

( * ) Notice: Subject to any disclaimer, the term of this patent is extended or adjusted under 35 U.S.C. 154(b) by 470 days.

(21) Appl. No.: 16/080,722

(22) PCT Filed: Mar. 13, 2017

(86) PCT No.: PCT/US2017/022087
§ 371 (c)(1),
(2) Date: Aug. 29, 2018

(87) PCT Pub. No.: WO2017/165144
PCT Pub. Date: Sep. 28, 2017

(65) Prior Publication Data
US 2019/0070934 A1    Mar. 7, 2019

Related U.S. Application Data

(60) Provisional application No. 62/311,538, filed on Mar. 22, 2016, provisional application No. 62/315,748, filed on Mar. 31, 2016.

(51) Int. Cl.
*B60H 1/24* (2006.01)
*B60H 1/00* (2006.01)
(Continued)

(52) U.S. Cl.
CPC ......... *B60H 1/249* (2013.01); *B60H 1/00528* (2013.01); *F16K 15/00* (2013.01);
(Continued)

(58) Field of Classification Search
CPC .... B60H 1/249; B60H 1/00528; B60H 1/248; B60H 1/26; F16K 15/00; F24F 13/14
(Continued)

(56) References Cited

U.S. PATENT DOCUMENTS 6,866,576 B2 *  3/2005  Quinn .................... B60H 1/248
                                             454/162
2012/0192978 A1 *  8/2012  Carlson ................. B60H 1/249
                                             137/855

FOREIGN PATENT DOCUMENTS

| GB | 1509177 | 4/1978 |
| JP | H09267625 | 10/1997 |
| WO | WO 2012/021366 | 2/2012 |

OTHER PUBLICATIONS

International Search Report and Written Opinion for PCT/US2017/022087.

* cited by examiner

*Primary Examiner* — Vivek K Shirsat
(74) *Attorney, Agent, or Firm* — Quarles & Brady LLP

(57) ABSTRACT

A pressure relief assembly includes a pressure relief device including a housing that defines at least one air passage chamber, and at least one flap secured within the air passage chamber(s). The pressure relief device is configured to securely couple to a component. A cover is secured to the pressure relief device. At least one impact-absorbing bumper is disposed between the pressure relief device and the cover. The impact-absorbing bumper(s) is configured to dampen impact energy and undesirable noise.

20 Claims, 11 Drawing Sheets

(51) Int. Cl.
  *F24F 13/14* (2006.01)
  *F16K 15/00* (2006.01)
  *F16K 15/06* (2006.01)

(52) U.S. Cl.
  CPC ........ *F24F 13/14* (2013.01); *B60H 2001/006* (2013.01); *F16K 15/06* (2013.01); *F24F 13/1406* (2013.01)

(58) Field of Classification Search
  USPC ........... 454/162–165, 274–276, 367–368, 94
  See application file for complete search history.

ion No. PCT/US2017/022087, entitled "Impact-Absorbing Pressure Relief Assembly Having Cover," filed Mar. 13, 2017, which relates to and claims priority benefits from U.S. Provisional Patent Application No. 62/311,538, entitled "Impact-Absorbing Pressure Relief Assembly Having Cover," filed Mar. 22, 2016, and U.S. Provisional Patent Application No. 62/315,748, entitled "Impact-Absorbing Pressure Relief Assembly Having Cover," filed Mar. 31, 2016, all which are hereby incorporated by reference in their entireties.

IMPACT-ABSORBING PRESSURE RELIEF ASSEMBLY HAVING COVER

RELATED APPLICATIONS

This application is a National Phase of International Application No. PCT/US2017/022087, entitled "Impact-Absorbing Pressure Relief Assembly Having Cover," filed Mar. 13, 2017, which relates to and claims priority benefits from U.S. Provisional Patent Application No. 62/311,538, entitled "Impact-Absorbing Pressure Relief Assembly Having Cover," filed Mar. 22, 2016, and U.S. Provisional Patent Application No. 62/315,748, entitled "Impact-Absorbing Pressure Relief Assembly Having Cover," filed Mar. 31, 2016, all which are hereby incorporated by reference in their entireties.

FIELD OF EMBODIMENTS OF THE DISCLOSURE

Embodiments of the present disclosure generally relate to a venting or pressure relief device configured for use in an enclosed area, such as an automobile, and more particularly to systems and methods for reducing noise that may be generated by a pressure relief assembly.

BACKGROUND

Interior cabins of vehicles typically include cabin vents or pressure relief devices. Without such devices, air pressure inside the vehicle cabin could damage occupants' ear drums. Further, when a vehicle door is closed, air pressure within the vehicle needs to be relieved or the door will not close. If an air bag is activated in a vehicle that does not have a venting or pressure relief device, an occupant's ear drums may be damaged.

Pressure relief devices are usually hidden from view. For example, a pressure relief device may be found in a trunk or on a body frame pillar structure. Each pressure relief device is adapted to allow air to pass out of an enclosed structure, while also preventing a significant amount of air, dust, water or other contaminants into the enclosed area. Thus, pressure relief devices are, in essence, one-way valves or one-way check valves, and are configured to maintain a small amount of back pressure per customer specifications.

A conventional pressure relief device includes a plastic housing having a plurality of air passages. A light membrane is positioned over the air passages, and is configured to allow air to pass in one direction. In order to allow air to pass, the light membrane opens off of the main body in response to air flow. Typically, a seal is provided around the main body and acts to seal the hole in the mating structure upon assembly. The seal is typically molded around the main body in a secondary molding operation, or may be adhesively or chemically attached to the main body.

During installation, the pressure relief device may be snap fit to a structure. Typically, a user presses on the four corners of the pressure relief device in order to secure it within a reciprocal hole in a structure, such as a frame or sheet within a vehicle.

A known pressure relief assembly includes bumper towers. The bumper towers include rigid supports having a soft material molded therebetween. In particular, the known pressure relief assembly includes a long column of material and bumper towers that guide the material up to an interior surface of the cover. The bumper towers abut into an interior surface of a cover. However, it has been found that the cover is susceptible to rattling against the pressure relief device, which generates objectionable noise. Further, the cover is susceptible to fracturing when impacted with debris.

SUMMARY OF EMBODIMENTS OF THE DISCLOSURE

A need exists for a pressure relief assembly having a cover that generates less noise (such as that caused by rattling) than the known pressure relief assembly. A need also exists for a pressure relief assembly that resists fracturing when impacted with debris.

With those needs in mind, certain embodiments of the present disclosure provide a pressure relief assembly that includes a pressure relief device including a housing that defines at least one air passage chamber, and at least one flap secured within the air passage chamber(s). The pressure relief device is configured to securely couple to a component. A cover is secured to the pressure relief device. At least one impact-absorbing bumper is disposed between the pressure relief device and the cover. The impact-absorbing bumper(s) is configured to dampen impact energy and reduce undesirable noise.

In at least one embodiment, the impact-absorbing damper(s) is formed on the pressure relief device. The impact-absorbing bumper(s) may be formed of an elastomeric material.

One of the pressure relief device or the cover may include at least one securing coupler, and the other of the pressure relief device or the cover may include at least one retainer. In this embodiment, the cover is secured to the pressure relief device via the securing coupler(s) securing to the retainer(s). The impact-absorbing bumper(s) may contact at least a portion of the securing coupler(s). For example, at least a portion of the impact-absorbing bumper(s) may be compressed between a first portion of the securing coupler(s) and a second portion of the pressure relief device. The impact-absorbing bumper(s) may be within or outside a retaining chamber of the retainer(s). The securing coupler(s) may snapably secure to the retainer(s).

The impact-absorbing bumper may include a raised dampening body. In at least one embodiment, the raised dampening body is a straight linear body. In at least one other embodiment, the raised dampening body is L-shaped.

The pressure relief device may include at least one forming hole. The forming hole(s) is configured to allow forming material to pass therethrough to form the impact-absorbing bumper(s).

Certain embodiments of the present disclosure provide a pressure relief assembly that includes a pressure relief device including a housing that defines air passage chambers, and flaps secured within the air passage chambers. The pressure relief device is configured to securely couple to a component. A cover is configured to be secured to the pressure relief device. Impact-absorbing bumpers are secured to a perimeter rim of the pressure relief device. The impact-absorbing bumpers are compressed into the perimeter rim by the cover when the cover is secured to the pressure relief device. The impact-absorbing bumpers are configured to dampen impact energy and reduce undesirable noise.

Figure 1:
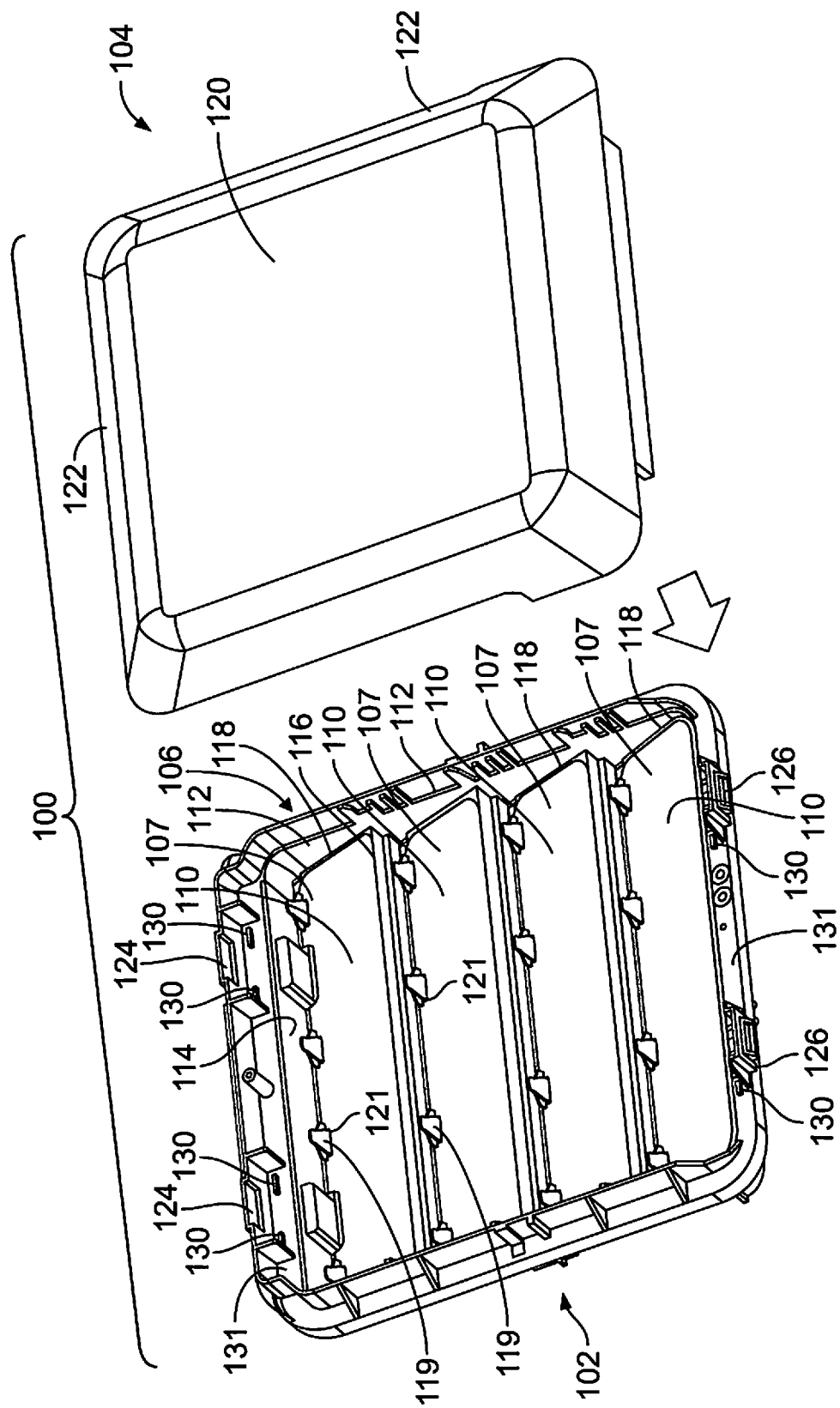
FIG. 1 illustrates a front perspective view of a pressure relief assembly including a pressure relief device separated from a cover, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a pressure relief assembly including one or more impact-absorbing bumpers that are configured to cushion impact exerted into a cover. In at least one embodiment, the bumpers are formed on a portion of a housing and abut into a portion of the cover.

The pressure relief assembly including the pressure relief device and the cover is configured to absorb and cushion energy from impact, thereby resisting damage to the cover and the pressure relief device. In at least one embodiment, the pressure relief device includes bumpers on frame portions of a housing. Each bumper may be formed of a thermoplastic elastomer (TPE), rubber, or other such elastomeric material. Alternatively, various other materials (such as other elastomers) may be used to form the bumpers. The cover is secured to the pressure relief device to slightly interfere with the bumpers, thereby preventing or otherwise reducing rattling. The bumpers provide dampers that absorb forces that may otherwise cause rattling. Additionally, the bumpers provide shock absorbers that cushion forces of debris impact.

Embodiments of the present disclosure provide a pressure relief assembly including a pressure relief device and a cover. One or more impact-absorbing bumpers are configured to cushion impacts exerted into the cover. Embodiments of the present disclosure provide a pressure relief device and cover that resist impact forces and damage.

FIG. 1 illustrates a front perspective view of a pressure relief assembly 100 including a pressure relief device 102 separated from a cover 104, according to an embodiment of the present disclosure. The cover 104 is configured to secure over the pressure relief device 102, such as through a snapable engagement.

The pressure relief device 102 is configured to secure to a component, such as a panel of sheet metal of a vehicle, for example. The pressure relief device 102 secures into an opening formed through the panel. For example, the pressure relief device 102 snapably secures into the opening formed through the panel. The cover 104 then snapably secures over the pressure relief device 102.

The pressure relief device 102 includes a frame or housing 106 that includes a plurality of air passage chambers 107 that define airflow openings (hidden from view in FIG. 1). Flaps 110 secure in the air passage chambers 107 over the airflow openings. The pressure relief device 102 may include more or less air passage chambers 107 and flaps 110 than shown.

Each air passage chamber 107 includes lateral walls 112 integrally connected to top and bottom walls 114 and 116, respectively. An air passage wall 118 (which may be partially defined by support ribs) extends between the lateral, top and bottom walls 112, 114, and 116, respectively. The air passage walls 118 define the airflow openings that are configured to allow air to pass therethrough. The air passage wall 118 angles upwardly from the top wall 114 towards the bottom wall 116. The angle of the air passage wall 118 may vary based on a desired amount of flap resistive force.

The housing 106 may be formed of a plastic, such as acrylic. In at least one embodiment, the housing 106 is formed of injection-molded polypropylene. The housing 106 may be formed through a thermoforming process, which is generally an efficient and economical way of making various plastic devices. During the manufacturing process, a roll of plastic may be fed into a cavity, and then the plastic is formed using heat and pressure.

Instead of a plurality of air passage chambers 107, the housing 106 may include a single air passage chamber 107. Also, optionally, the air passage wall 118 may be coplanar with a flat underside of the housing 106, instead of being angled.

In closed positions, the flaps 110 cover the air passage walls 118. Each flap 110 may be anchored to the housing 106 proximate to the top wall 114. For example, each flap 110 mounts to the housing 106 through first attachments, such as connecting posts 119 outwardly extending above the airflow openings. Each flap 110 may be a flexible membrane having channels 121 formed proximate to an upper edge. The connecting posts 119 extend through the channels 121 to secure the flaps 110 to the housing 106. The flaps 110 may be formed of a flexible thermoplastic elastomer, such as ethylene propylene diene monomer (EPDM) rubber, polypropylene, Hytrel, Lexan, Tyvac or Mylar, for example.

In at rest positions, the flaps 110 cover the airflow openings formed through the air passage walls 118. As air pressure builds and is exerted into an underside of the flaps 110, the flaps 110 flap open so that the airflow openings are exposed, thereby allowing air to vent through the pressure relief assembly 100.

The cover 104 fits over the pressure relief device 102 in order to protect the components of the pressure relief device 102 (such as the flaps 110) from foreign objects/debris, impacts, and the like. The cover 104 includes a main covering panel 120 connected to an outer wall 122. The cover 104 includes securing couplers (hidden from view in FIG. 1) that snapably secure to reciprocal retainers 124 and 126 formed on the housing 106 of the pressure relief device 102. The retainers 124 and 126 may be sized and shaped differently from one another. Optionally, the retainers 124 and 126 may be sized and shaped the same.

Impact-absorbing bumpers 130 are positioned on the housing 106 proximate to the retainers 124 and 126. The bumpers 130 are separate and distinct from a perimeter seal of the pressure relief device 102 that is configured to sealingly engage around a hole formed through a component to which the pressure relief device 102 secures. The bumpers 130 may be formed of TPE, rubber, or various other elastomers, for example. The bumpers 130 are configured to abut into the portions of the securing couplers of the cover 104 when the cover 104 is securely mounted to the housing 106. In at least one embodiment, the bumpers 130 are compressively sandwiched between the securing couplers of the cover 104 and the housing 106 (such as a perimeter rim 131 of the housing 106) when the cover 104 is secured to the pressure relief device 102.

Figure 2:
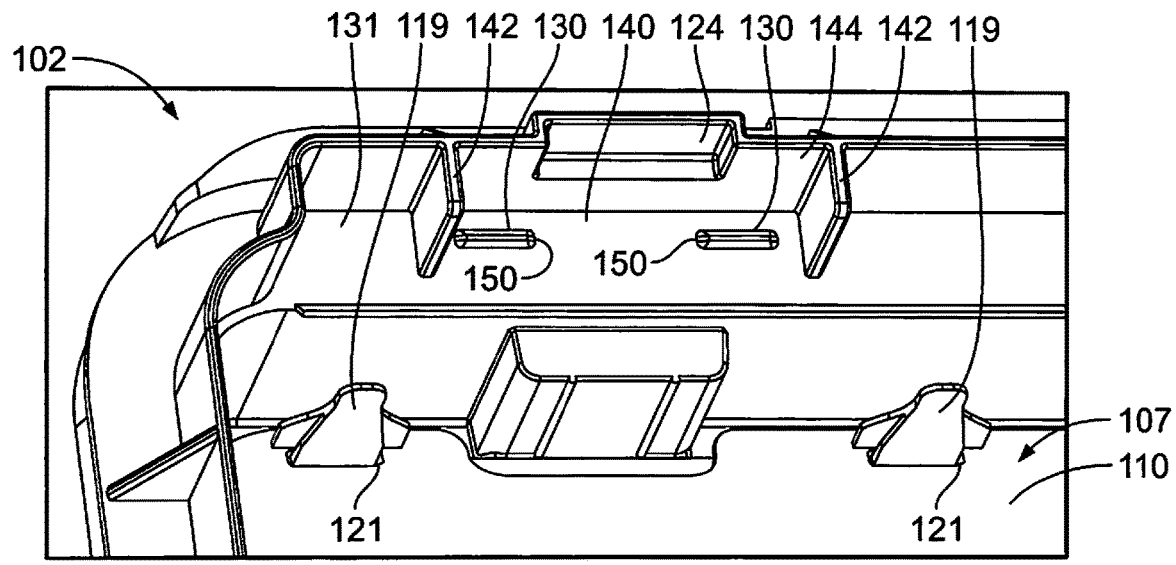
FIG. 2 illustrates a front perspective view of impact-absorbing bumpers formed on a rim of a housing of a pressure relief device, according to an embodiment of the present disclosure.

FIG. 2 illustrates a front perspective view of the impact-absorbing bumpers 130 formed on the rim 131 of the housing 106 of the pressure relief device 102, according to an embodiment of the present disclosure. At least some of the impact-absorbing bumpers 130 may outwardly extend from the rim 131 within a retaining chamber 140 defined by a retainer 124. The retaining chamber 140 is defined between lateral walls 142 and an upper wall 144 of the retainer 124.

The impact-absorbing bumpers 130 include a raised dampening body 150 that outwardly extends from the rim 131. The raised dampening body 150 may be a longitudinal linear body. In at least one other embodiment, the raised dampening body 150 may include angled or curved surfaces. For example, the raised dampening body 150 may be L-shaped, T-shaped, circular or hemispherical, and/or the like. As shown, two impact-absorbing bumpers 130 may be within the retaining chamber 140. Alternatively, a single impact-absorbing bumper 130 may be within the retaining chamber 140. For example, a single impact-absorbing bumper 130 may span between the opposed lateral walls 142. A single impact-absorbing bumper 130 may cover an entire surface of the rim 131 between the lateral walls 142 and the upper wall 144. As another alternative, more than two impact-absorbing bumpers 130 may outwardly extend within the retaining chamber 140.

Figure 3:
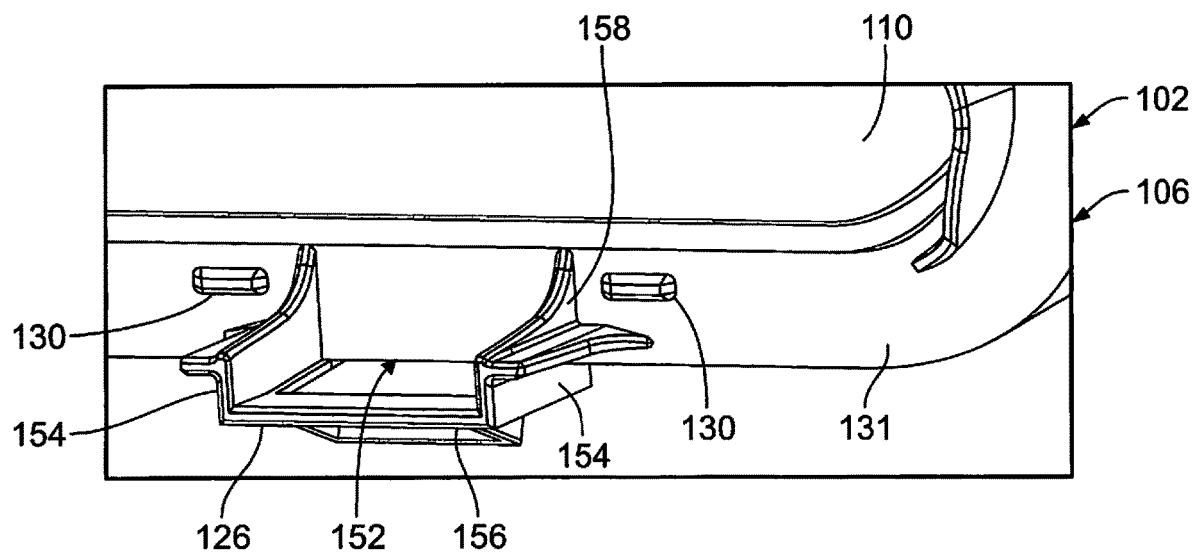
FIG. 3 illustrates a front perspective view of impact-absorbing bumpers formed on a rim of a housing of a pressure relief device, according to an embodiment of the present disclosure.

FIG. 3 illustrates a front perspective view of impact-absorbing bumpers 130 formed on the rim 131 of the housing 106 of the pressure relief device 102, according to an embodiment of the present disclosure. At least some of the impact-absorbing bumpers 130 may outwardly extend from the rim 131 outside of a retaining chamber 152 defined by a retainer 126. The retaining chamber 152 is defined between lateral walls 154 and a lower wall 156 of the retainer 126. As shown, an impact-absorbing bumper 130 may be proximate to an outer lateral surface 158 of each lateral wall 156 of the retaining chamber 152. Alternatively, more than two impact-absorbing bumpers 130 may outwardly extend outside of the retaining chamber 152.

Figure 4:
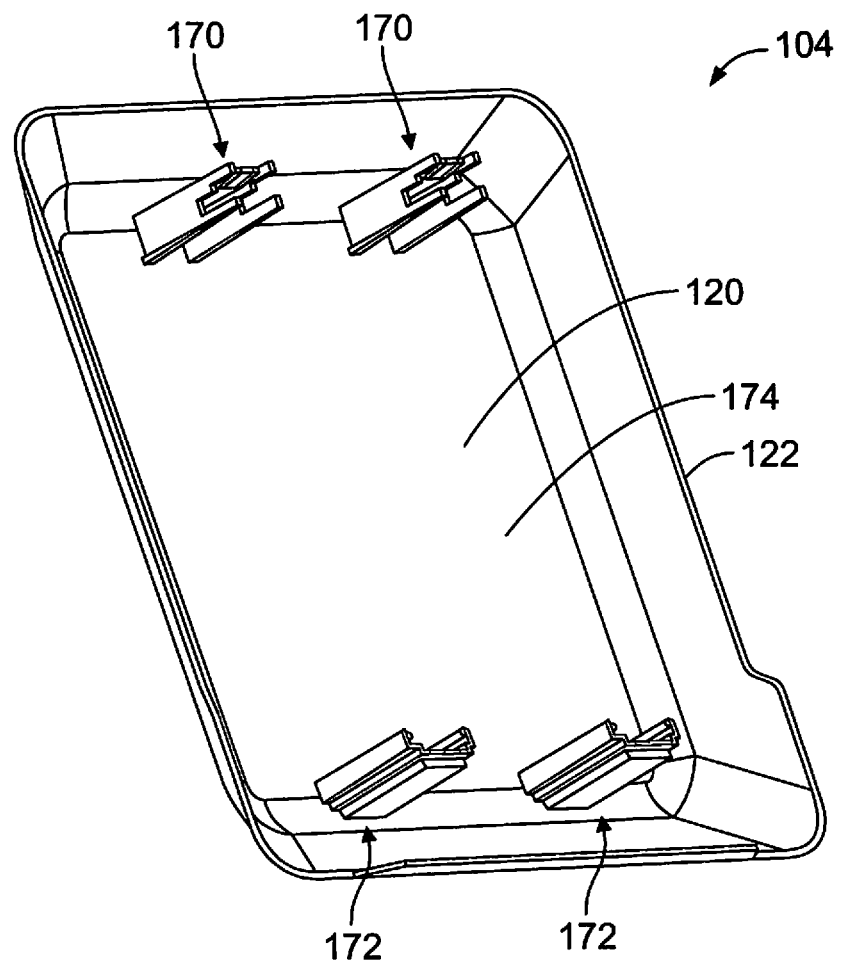
FIG. 4 illustrates a bottom perspective view of a cover, according to an embodiment of the present disclosure.

FIG. 4 illustrates a bottom perspective view of the cover 104, according to an embodiment of the present disclosure. Securing couplers 170 and 172 outwardly extend from a lower surface 174 of the covering panel 120. The securing couplers 170 are configured to snapably secure to the retainers 124, while the securing couplers 172 are configured to snapably secure to the retainers 126. Optionally, the securing couplers 170 and 172 may be sized and shaped the same.

Figure 5:
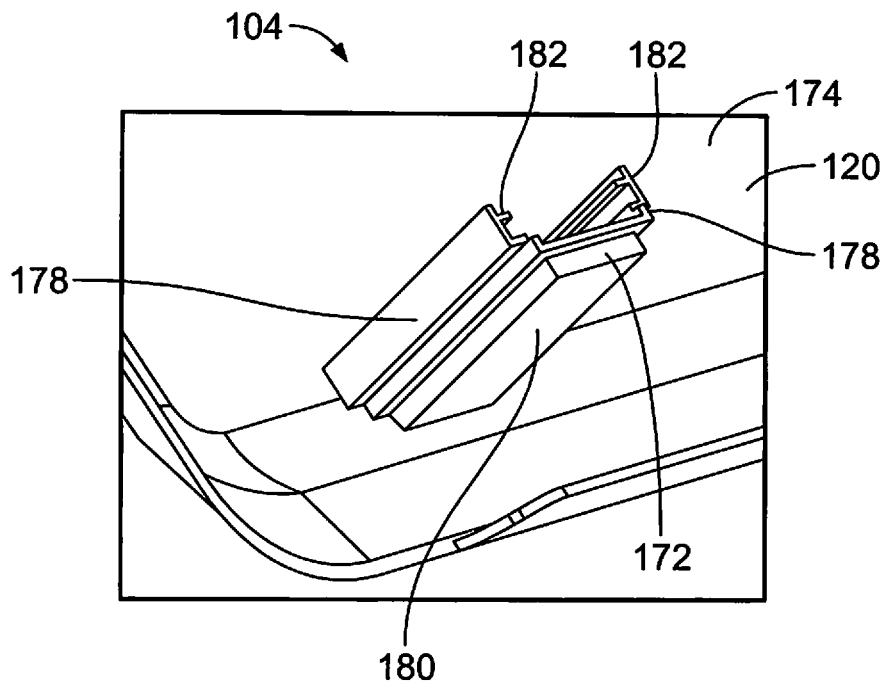
FIG. 5 illustrates a bottom perspective view of a securing coupler extending from a lower surface of a covering panel of a cover, according to an embodiment of the present disclosure.

FIG. 5 illustrates a bottom perspective view of a securing coupler 172 extending from the lower surface 174 of the covering panel 120 of the cover 104, according to an embodiment of the present disclosure. The securing coupler 172 includes lateral beams 178 connected by a lower spanning beam 180 that snapably secures to a reciprocal portion of a retainer 126. Exposed bottom edges 182 of the lateral beams 178 are configured to abut into and compress the impact-absorbing bumpers 130 positioned outside of the retaining chamber 152 shown in FIG. 3. The securing coupler 172 may snapably secure around the retaining chamber 152 of the retainer 126.

Figure 6:
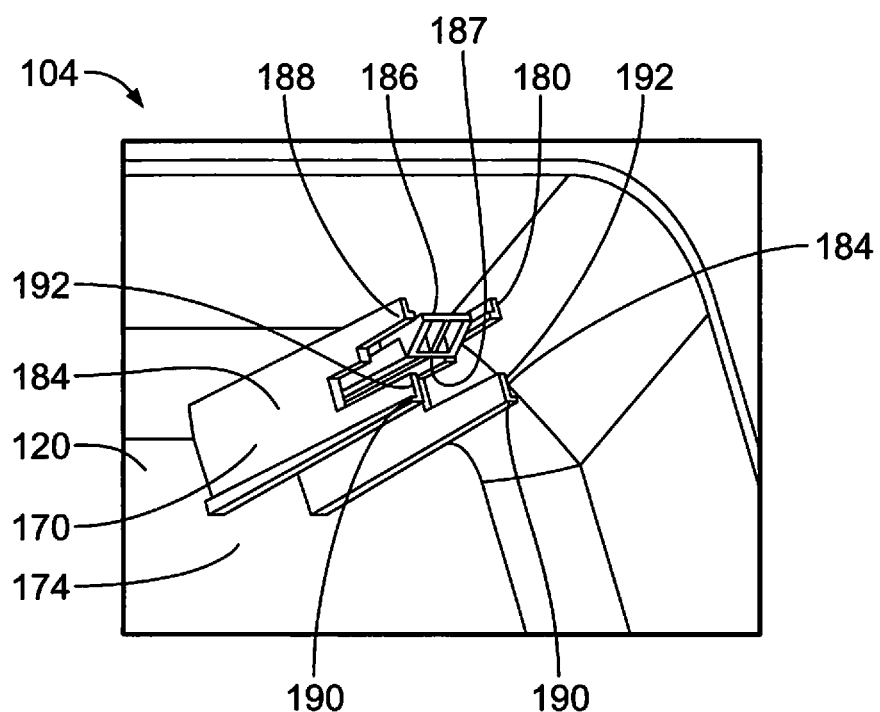
FIG. 6 illustrates a bottom perspective view of a securing coupler extending from a lower surface of a covering panel of a cover, according to an embodiment of the present disclosure.

FIG. 6 illustrates a bottom perspective view of a securing coupler 170 extending from the lower surface 174 of the covering panel 120 of the cover 104, according to an embodiment of the present disclosure. The securing coupler 170 includes lateral beams 184 connected to an upper spanning beam 186 that snapably secures to a reciprocal portion of a retainer 124. For example, a resilient hook 187 is configured to snapably hook onto a portion of the rim 131 of the pressure relief device 102 (shown in FIG. 1, for example). Each lateral beam 184 includes an upper arm 188 and a lower arm 190. The upper arms 188 provide a protective bracing support for the retainer 124, while exposed bottom edges 192 of the lower arms 190 are configured to compress the impact-absorbing bumpers 130 positioned within the retaining chamber 140 shown in FIG.

2. At least a portion of the securing coupler 170 may be secured within the retaining chamber 140 of the retainer 124.

Figure 7:
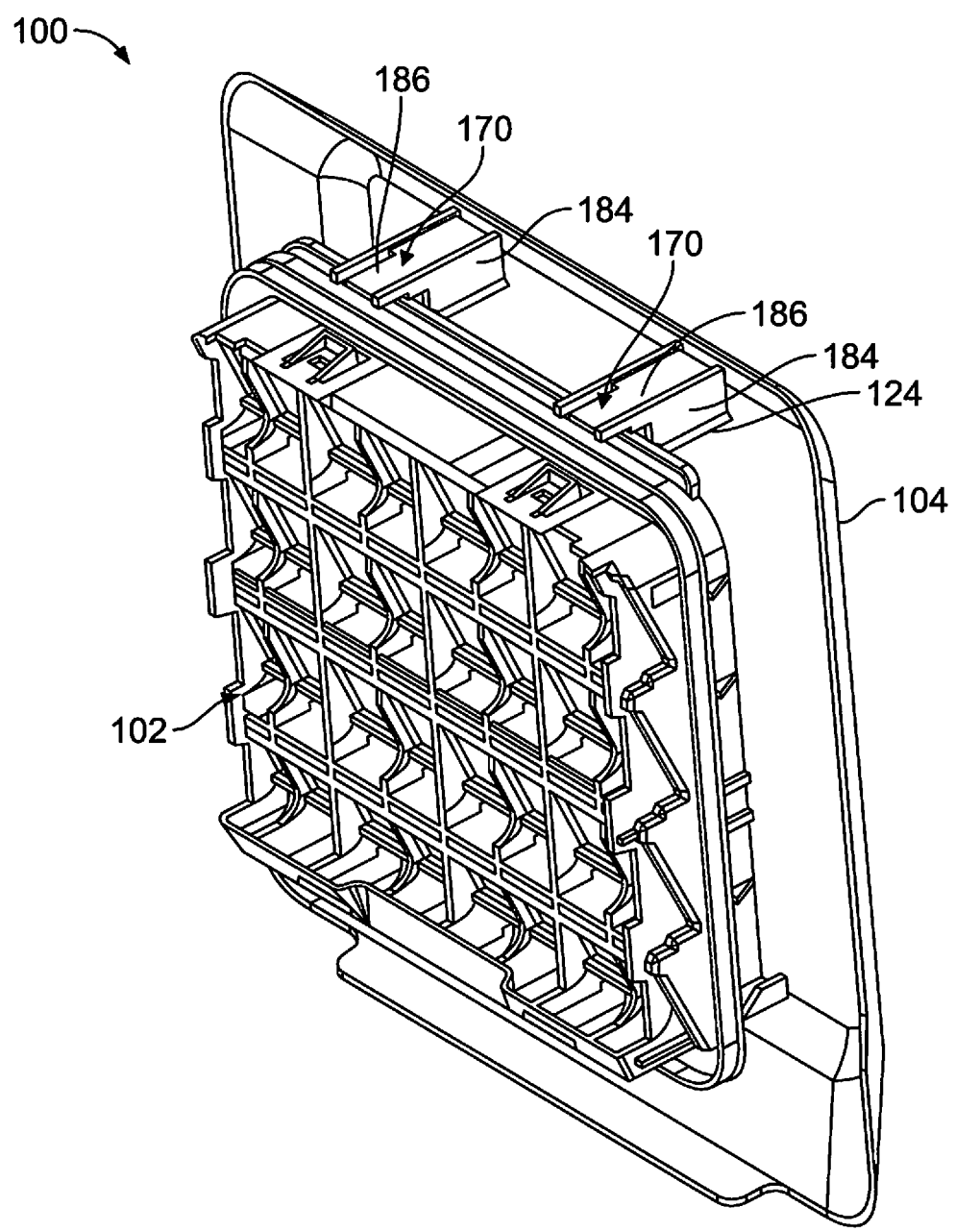
FIG. 7 illustrates an upper bottom perspective of a pressure relief assembly, according to an embodiment of the present disclosure.

FIG. 7 illustrates an upper bottom perspective of the pressure relief assembly 100, according to an embodiment of the present disclosure. The securing couplers 170 are snapably secured to the retainers 124, thereby securing the cover 104 to the pressure relief device 102.

Figure 8:
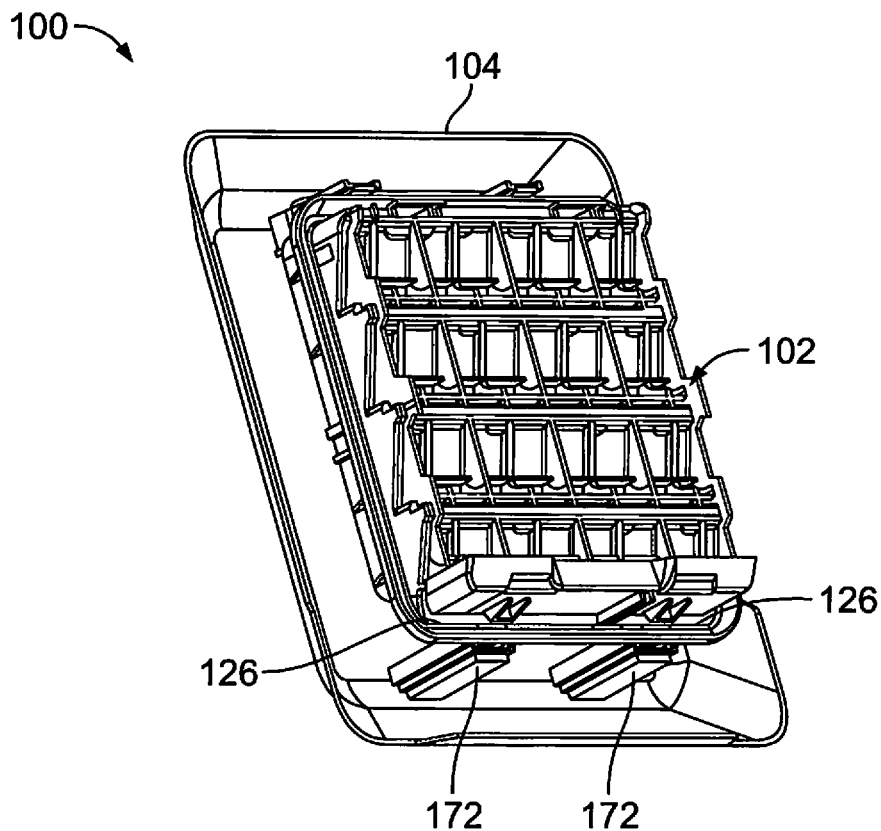
FIG. 8 illustrates a lower bottom perspective view of a pressure relief assembly, according to an embodiment of the present disclosure.

FIG. 8 illustrates a lower bottom perspective of the pressure relief assembly 100, according to an embodiment of the present disclosure. The securing couplers 172 are snapably secured to the retainers 126, thereby securing the cover 104 to the pressure relief device 102.

Figure 9:
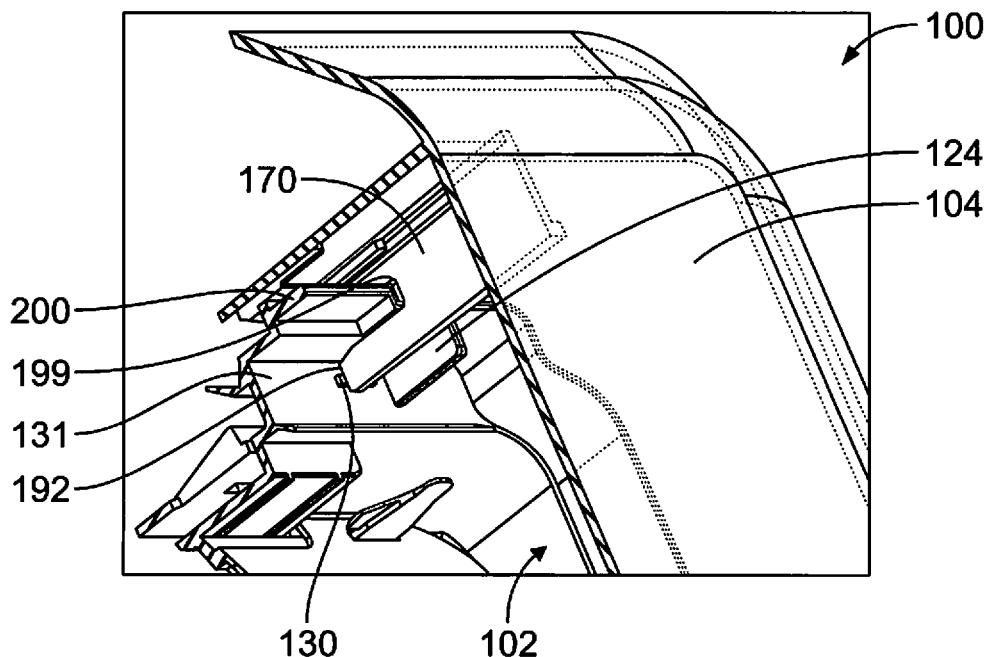
FIG. 9 illustrates a perspective interior view of a pressure relief assembly in which a securing coupler of a cover is secured by a retainer of a pressure relief device, according to an embodiment of the present disclosure.
Figure 10:
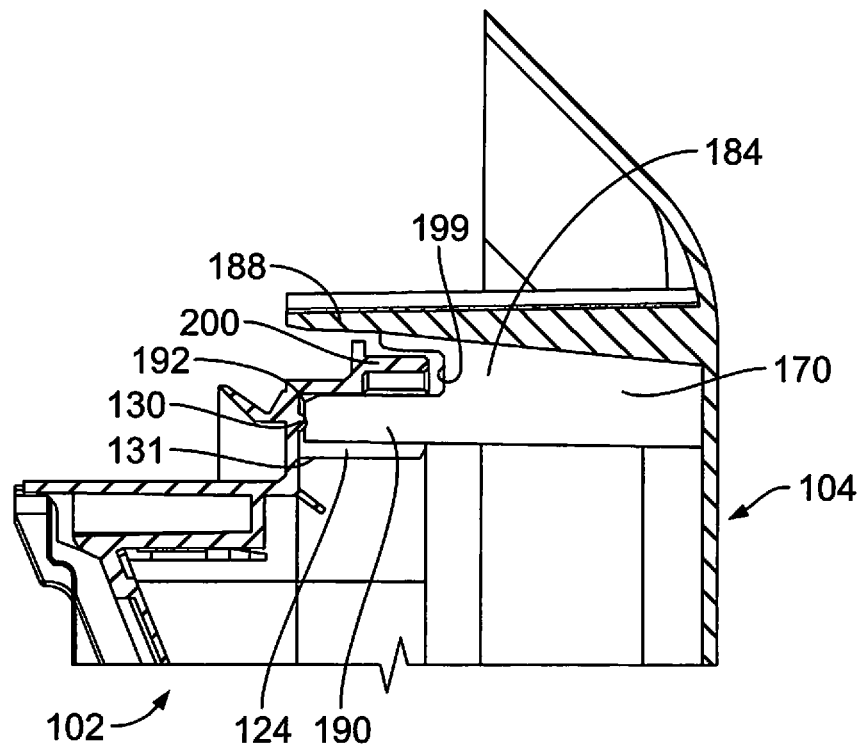
FIG. 10 illustrates a lateral interior view of a pressure relief assembly in which a securing coupler of a cover is secured by a retainer of a pressure relief device, according to an embodiment of the present disclosure.

FIG. 9 illustrates a perspective interior view of the pressure relief assembly 100 in which a securing coupler 170 of the cover 104 is secured by the retainer 124 of the pressure relief device 102, according to an embodiment of the present disclosure. FIG. 10 illustrates a lateral interior view of the pressure relief assembly 100 in which the securing coupler 170 of the cover 104 is secured by the retainer 124 of the pressure relief device 102. Referring to FIGS. 9 and 10, a slot 199 of each lateral beam 184 may fit over a boundary wall 200 of the rim 131 of the pressure relief device 102, such that the upper arm 188 is disposed on an outer side of the boundary wall 200, while the lower arm 190 is disposed on an interior side of the boundary wall 200. As shown, portions of the securing coupler 170, such as the exposed bottom edges 192, abut into the bumper 130. When the cover 104 is secured to the pressure relief device 102, the exposed bottom edges 192 compress the bumper 130 into the rim 131. Referring to FIGS. 1, 4, 6, 9, and 10, each securing coupler 170 directly engages two bumpers 130. As such, the two securing couplers 170 contact four of the bumpers 130, such as at the interfaces between the four bumpers 130 and the four exposed bottom edges 192.

Figure 11:
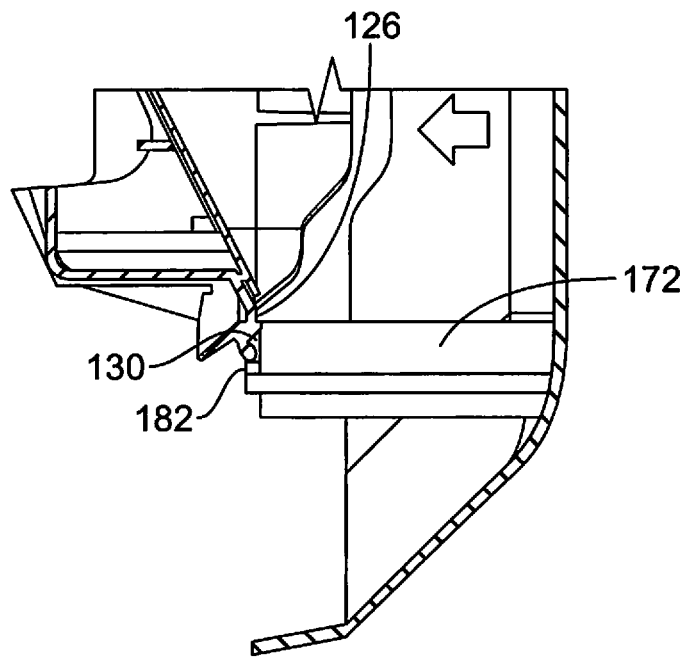
FIG. 11 illustrates a lateral interior view of a pressure relief assembly in which a securing coupler of a cover is secured by a retainer of a pressure relief device, according to an embodiment of the present disclosure.

FIG. 11 illustrates a lateral interior view of the pressure relief assembly 100 in which a securing coupler 172 of the cover 104 is secured by a retainer 126 of a pressure relief device 102, according to an embodiment of the present disclosure. Portions of the securing couplers 172, such as the exposed bottom edges 182, abut into and compress the bumpers 130. Referring to FIGS. 1, 4, 5, and 11, each securing coupler 172 directly contacts two bumpers 130. As such, the two securing couplers 172 contact four of the bumpers 130, such as at the interfaces between the four bumpers 130 and the four exposed bottom edges 182.

Referring to FIGS. 1, 4, 5, 6, 9, 10, and 11, when the cover 104 is secured to the pressure relief devices 102, eight impact-absorbing interfaces are provided between the cover 104 and the pressure relief devices 102. Four impact-absorbing interfaces are provided between the two securing couplers 170 and four bumpers 130, while four additional impact-absorbing interfaces are provided between the two securing couplers 172 and four different bumpers 130. The bumpers 130 are compressed into the pressure relief devices 102 by the portions of the cover 104 (such as by exposed ends of the securing couplers 170 and 172). The bumpers 130 absorb energy (such as shocks or impacts exerted into the cover 104), thereby dampening impact forces and vibratory energy that may otherwise cause rattling and other such undesirable noise. The pressure relief assembly 100 may include more or less impact-absorbing interfaces than shown.

Figure 12:
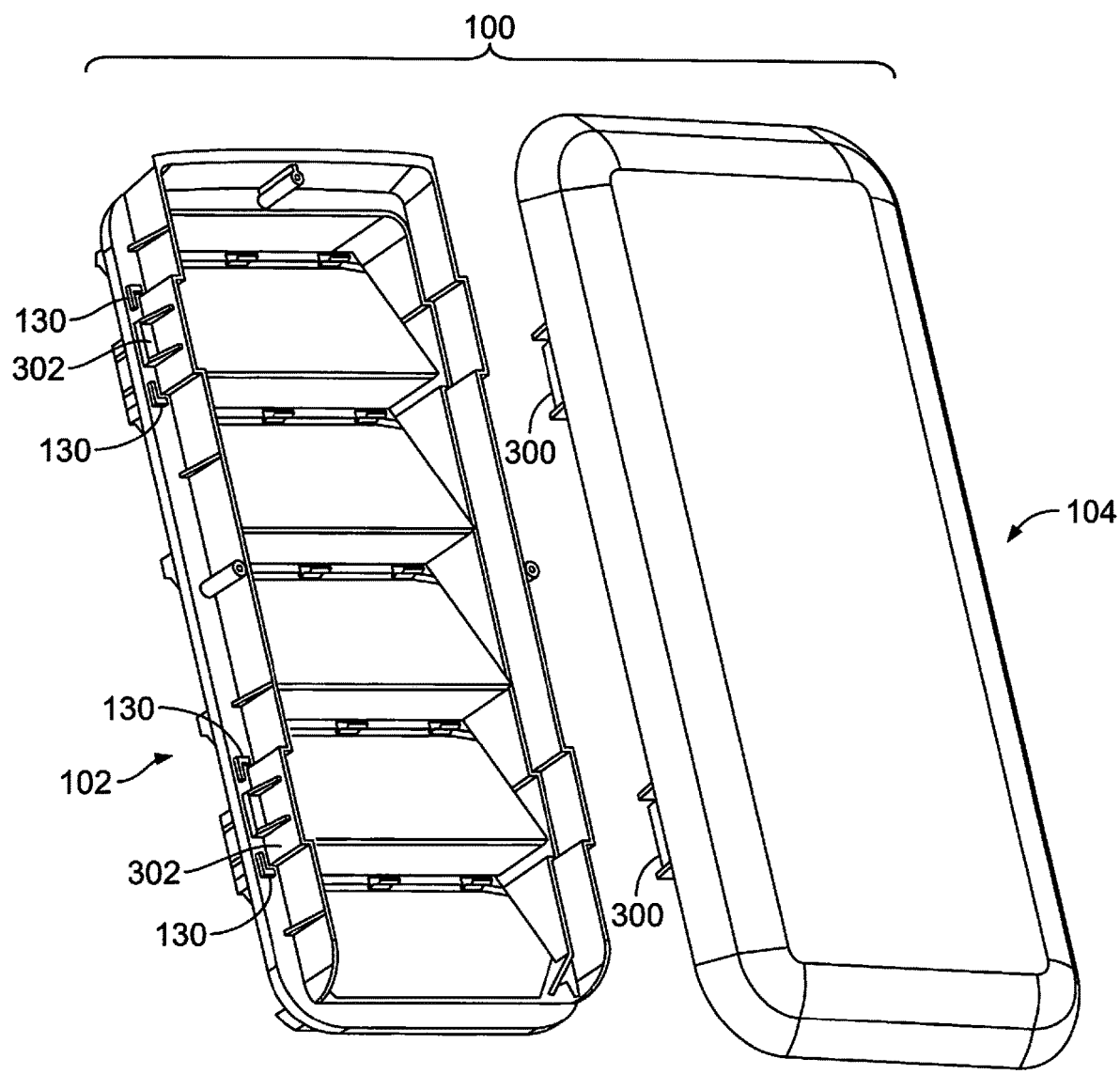
FIG. 12 illustrates a front perspective view of a pressure relief assembly including a pressure relief device separated from a cover, according to an embodiment of the present disclosure.

FIG. 12 illustrates a front perspective view of a pressure relief assembly 100 including a pressure relief device 102 separated from a cover 104, according to an embodiment of the present disclosure. The pressure relief assembly 100 is similar to the pressure relief assembly 100 shown in FIG. 1, except that securing couplers 300 of the cover 104 engage reciprocal retainers 302 at sides of the pressure relief device 102. Further, the bumpers 130 may be L-shaped and configured to abut into bottom exposed surfaces of upper and lateral beams of the securing couplers 300. The securing couplers 300 snapably secure to the retainers 302, thereby securing the cover 104 to the pressure relief device 102. The bumpers 130 absorb energy, thereby dampening impact forces and vibratory energy that may otherwise cause undesirable noise.

Figure 13:
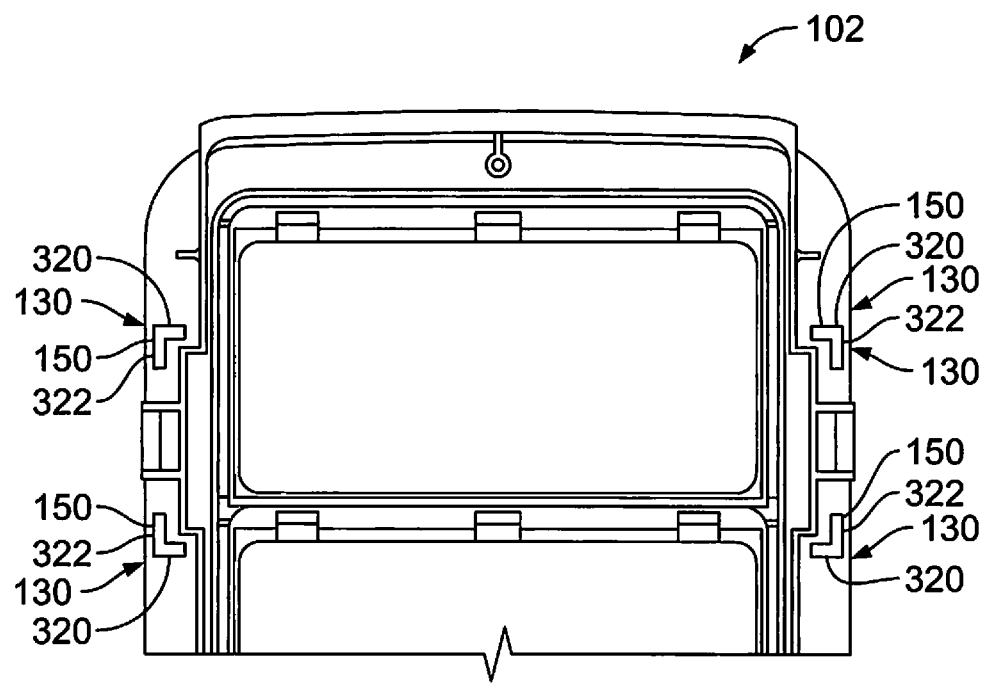
FIG. 13 illustrates a front view of a pressure relief device, according to an embodiment of the present disclosure.

FIG. 13 illustrates a front view of the pressure relief device 102, according to an embodiment of the present disclosure. As shown, each bumper 130 may be L-shaped having a raised dampening body 150 that includes a first portion 320 that orthogonally connects to a second portion 322, thereby forming a right angle therebetween.

Figure 14:
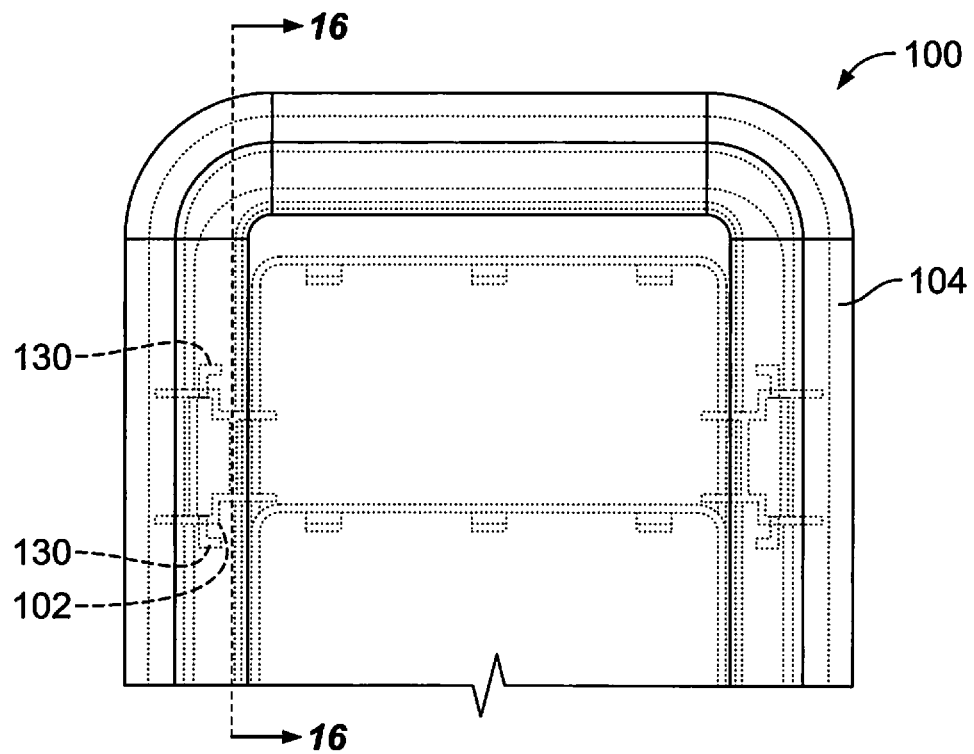
FIG. 14 illustrates a front view of a pressure relief assembly including a cover secured to a pressure relief device, according to an embodiment of the present disclosure.

FIG. 14 illustrates a front view of a pressure relief assembly 100 including a cover 104 secured to a pressure relief device 102, according to an embodiment of the present disclosure. The cover 104 is secured over the pressure relief device 102. The bumpers 130 directly engage portions of the cover 104. The cover 104 is secured to the pressure relief device 102 to slightly interfere with the bumpers 130, thereby preventing or otherwise reducing rattling. The bumpers 130 provide dampers that absorb forces that may otherwise cause rattling. Additionally, the bumpers 130 provide shock absorbers that cushion forces of impact. In general, the bumpers 130 as described in the present application cushion impact forces and protect the cover 104 and the pressure relief device 102 from damage.

Figure 15:
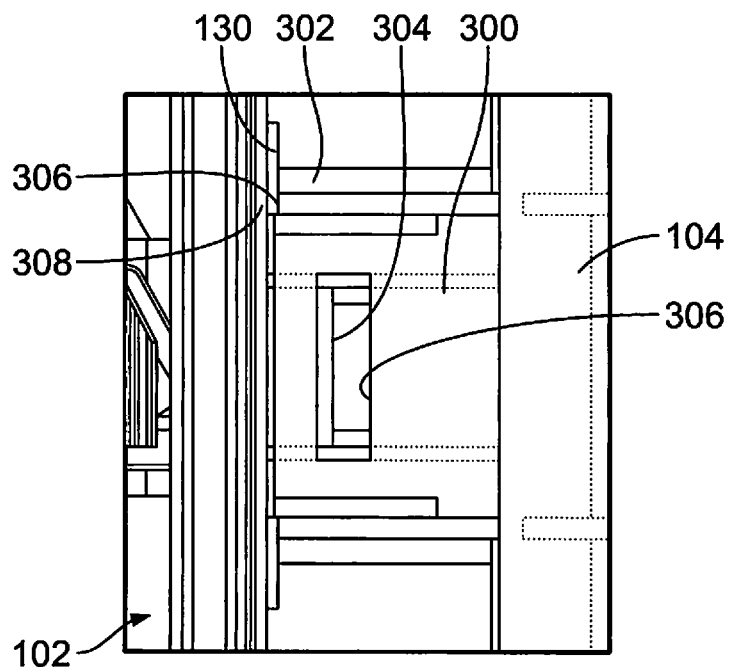
FIG. 15 illustrates a lateral view of a securing coupler of a cover compressing a portion of a bumper into a pressure relief device, according to an embodiment of the present disclosure.

FIG. 15 illustrates a lateral view of a securing coupler 300 of the cover 104 compressing a portion of a bumper 130 into a pressure relief device 102, according to an embodiment of the present disclosure. As shown, the securing couplers 300 may snapably or latchably secure over the retainers 302. A tab 304 of the retainer 302 may snapably secure into a slot 306 formed in the securing coupler 300. Exposed bottom edges 306 of the securing couplers 300 abut into and compress the bumpers 130 into a rim portion 308 of the pressure relief device 102.

Figure 16:
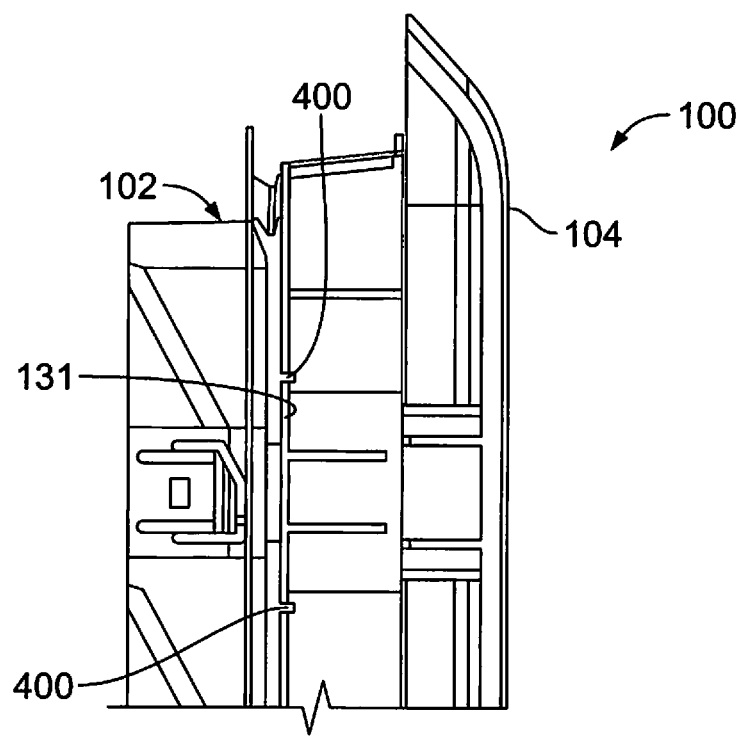
FIG. 16 illustrates a cross-sectional view of a pressure relief assembly through line 16-16 of FIG. 14, according to an embodiment of the present disclosure.
Figure 17:
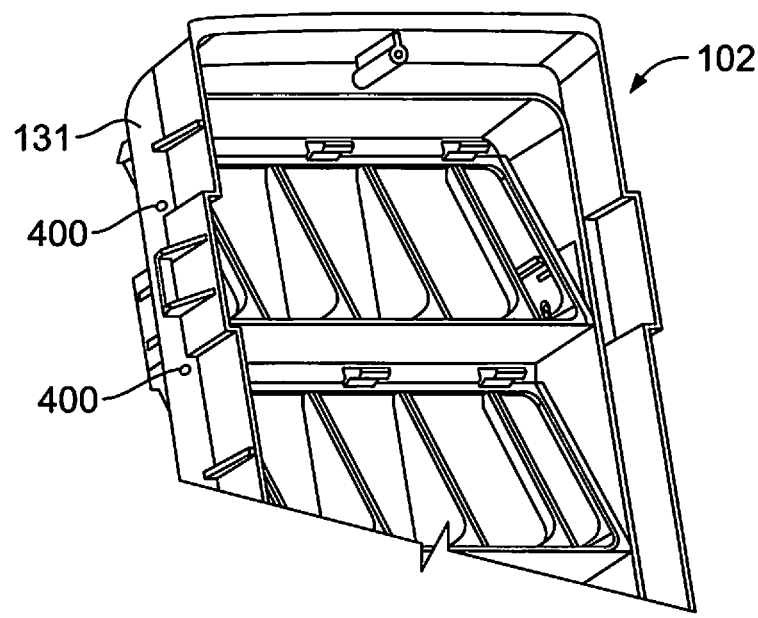
FIG. 17 illustrates a perspective front view of a pressure relief device before formation of bumpers, according to an embodiment of the present disclosure.

FIG. 16 illustrates a cross-sectional view of the pressure relief assembly 100 through line 16-16 of FIG. 14, according to an embodiment of the present disclosure. FIG. 17 illustrates a perspective front view of the pressure relief device 102 before formation of bumpers, according to an embodiment of the present disclosure. Referring to FIGS. 16 and 17, the bumpers may be molded through the pressure relief device 102, for example. For example, forming holes 400 may be formed through a perimeter rim 131 of the pressure relief device 102. The forming holes 400 provide channels for material that forms the bumpers to flow therethrough, such as during an injection-molding process. For example, the bumpers may be formed along with a separate and distinct circumferential seal through an injection-molding process.

Figure 18:
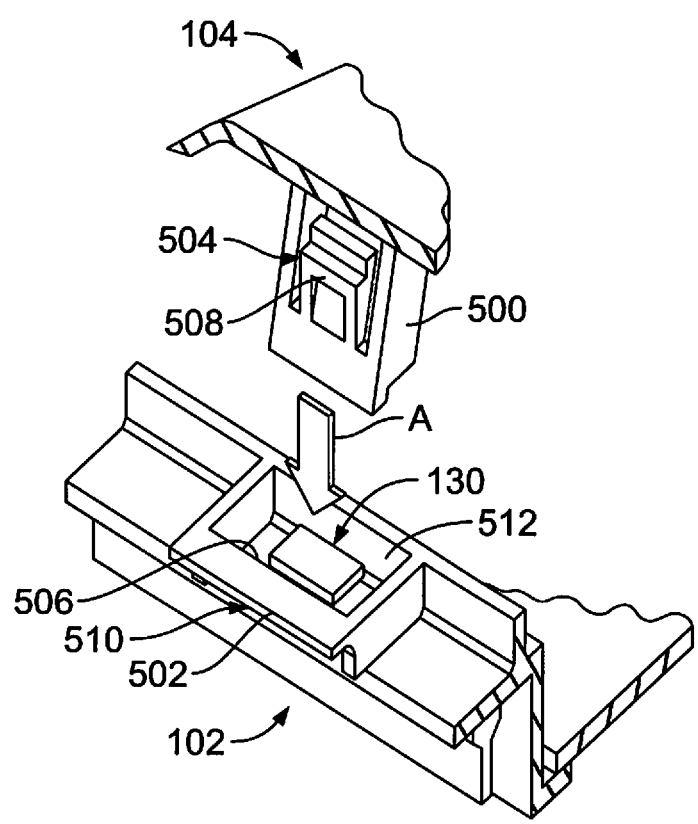
FIG. 18 illustrates a perspective front view of a securing coupler of a cover aligned with a retainer of a pressure relief device, according to an embodiment of the present disclosure.

FIG. 18 illustrates a perspective front view of a securing coupler 500 of a cover 104 aligned with a retainer 502 of a pressure relief device 102, according to an embodiment of the present disclosure. The securing coupler 500 may be or otherwise similar to any of the securing couplers described above, while the retainer 502 may be or otherwise similar to any of the retainer described above.

The cover 104 is shown positioned with respect to the pressure relief device 102 prior to mating. In order to secure the cover 104 to the pressure relief device 102, a detent 504 of the securing coupler 500 is aligned with a reciprocal mating ledge 506 of the retainer 502. After alignment, the cover 104 is urged towards the pressure relief device 102 in the direction of the arrow A. The detent 504 may be or include a resilient snap prong 508 that is configured to snapably secure into an opening 510 formed through the mating ledge 506. As shown, a bumper 130 may be positioned within a retaining chamber 512 of the retainer 502. The bumper 130 may be inboard (that is, set closer to a center of the pressure relief device 102) from a mating interface between the snap prong 508 and the opening 510 of the mating ledge 506. Alternatively, the cover 104 may include the mating ledge 506, while the pressure relief device 102 includes the snap prong 508.

The snap prong 508 and the mating ledge 506 provide a reliable and robust mating connection that securely connects the cover 104 to the pressure relief device 102. Additionally, the snap prong 508 mating with the mating ledge 506 provides an intuitive and easy method of securing the cover 104 to the pressure relief device 102. Further, when the snap prong 508 snaps into the opening 510 of the mating ledge 506, an audible click is generated, thereby signaling to an individual that the cover 104 is securely connected to the pressure relief device 102. The snap prong 508 and the mating ledge 506 may be used with respect to any of the embodiments of the present disclosure.

Referring to FIGS. 1-18, embodiments of the present disclosure provide a pressure relief assembly including a cover that secures over a pressure relief device. One or more bumpers are disposed between a portion of the cover and a portion of the pressure relief device. The bumpers provide dampeners that dampen the force of impacts and reduce undesirable noise. The bumpers are secured to a portion of the pressure relief device. Alternatively, instead of forming the bumpers on the pressure relief device, the bumpers may be formed on and coupled to bottom edges of securing couplers of the cover. The bumpers are separate and distinct from a sealing interface between the pressure relief device and a panel (such as sheet metal) to which the pressure relief device secures.

Embodiments of the present disclosure provide pressure relief assemblies having covers that are less susceptible generating noise than certain known pressure relief assemblies due to the impact-absorbing dampers. Embodiments of the present disclosure provide pressure relief assemblies that resist fracturing when impacted with debris due to the impact-absorbing dampers.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A pressure relief assembly comprising:
a pressure relief device including a housing that defines at least one air passage chamber, and at least one flap secured within the at least one air passage chamber, wherein the pressure relief device is configured to securely couple to a component;
a cover secured to the pressure relief device, the cover having at least one securing coupler extending from a lower surface of the cover, wherein the at least one securing coupler has an exposed bottom edge; and
at least one impact-absorbing bumper disposed between the pressure relief device and the exposed bottom edge of the at least one securing coupler of the cover when the cover is secured to the pressure relief device, wherein the at least one impact-absorbing bumper is configured to dampen impact energy and reduce undesirable noise.

2. The pressure relief assembly of claim 1, wherein the at least one impact-absorbing damper is formed on the pressure relief device.

3. The pressure relief assembly of claim 1, wherein the at least one impact-absorbing bumper is formed of an elastomeric material.

4. The pressure relief assembly of claim 1, wherein the pressure relief device comprises at least one retainer, wherein the cover is secured to the pressure relief device via the at least one securing coupler securing to the at least one retainer.

5. The pressure relief assembly of claim 4, wherein the at least one impact-absorbing bumper is compressively sandwiched between the pressure relief device and the exposed bottom edge of the at least one securing coupler.

6. The pressure relief assembly of claim 4, wherein at least a portion of the at least one impact-absorbing bumper extends from a rim of the pressure relief device.

7. The pressure relief assembly of claim 4, wherein the at least one impact-absorbing bumper is within a retaining chamber of the at least one retainer.

8. The pressure relief assembly of claim 4, wherein the at least one impact-absorbing bumper is outside of a retaining chamber of the at least one retainer.

9. The pressure relief assembly of claim 4, wherein the at least one securing coupler is snapably secured to the at least one retainer.

10. The pressure relief assembly of claim 1, wherein the at least one impact-absorbing bumper comprises a raised dampening body.

11. The pressure relief assembly of claim 10, wherein the raised dampening body is a straight linear body.

12. The pressure relief assembly of claim 10, wherein the raised dampening body is L-shaped.

13. The pressure relief assembly of claim 1, wherein the pressure relief device comprises at least one forming hole, wherein the at least one forming hole is configured to allow forming material to pass therethrough to form the at least one impact-absorbing bumper.

14. A pressure relief assembly comprising:
a pressure relief device including a housing that defines air passage chambers, and flaps secured within the air passage chambers, wherein the pressure relief device is configured to securely couple to a component;
a cover that is configured to be secured to the pressure relief device, wherein the cover includes at least one securing coupler extending from a lower surface of the cover, and wherein the at least one securing coupler has an exposed bottom edge; and
impact-absorbing bumpers secured to a perimeter rim of the pressure relief device, wherein the impact-absorbing bumpers are compressed into the perimeter rim by the exposed bottom edge of the cover when the cover is secured to the pressure relief device, wherein the impact-absorbing bumpers are configured to dampen impact energy and reduce undesirable noise.

15. The pressure relief assembly of claim 14, wherein the pressure relief device comprises at least one retainer, wherein the cover secures to the pressure relief device via the at least one securing coupler securing to the at least one retainer.

16. The pressure relief assembly of claim 15, wherein the impact-absorbing bumpers are separate and distinct from a perimeter seal of the pressure relief device.

17. The pressure relief assembly of claim 15, wherein two impact-absorbing bumpers are compressed between the exposed bottom edge and the perimeter rim of the pressure relief device when the cover is secured to the pressure relief device.

18. The pressure relief assembly of claim 15, wherein the at least one securing coupler snapably secures to the at least one retainer.

19. The pressure relief assembly of claim 14, wherein each of the impact-absorbing bumpers comprises a raised dampening body.

20. A pressure relief assembly comprising:
a pressure relief device including a housing that defines air passage chambers, and flaps secured within the air passage chambers, wherein the pressure relief device is configured to securely couple to a component;
a cover that is configured to be secured to the pressure relief device, wherein one of the pressure relief device or the cover comprises securing couplers, and the other of the pressure relief device or the cover comprises retainers, wherein the cover secures to the pressure relief device via the securing couplers snapably securing to the retainers; and
impact-absorbing bumpers including raised dampening bodies formed of an elastomeric material secured to a perimeter rim of the pressure relief device, wherein the impact-absorbing bumpers are compressed into the perimeter rim by the cover when the cover is secured to the pressure relief device, wherein the impact-absorbing bumpers are configured to dampen impact energy and reduce undesirable noise, wherein at least portions of the impact-absorbing bumpers are compressed between first portions of the securing couplers and second portions of the pressure relief device when the cover is secured to the pressure relief device, and wherein the securing couplers are connected to the lower surface of the cover at third portions that are opposite the first portions.

* * * * *